(12) United States Patent
Ohlscher et al.

(10) Patent No.: US 10,160,020 B2
(45) Date of Patent: Dec. 25, 2018

(54) METHOD FOR MANUFACTURING A ROTATIONALLY SYMMETRICAL SHAPED ARTICLE

(71) Applicants: WF-MASCHINENBAU U. BLECHFORMTECHNIK GMBH & CO. KG, Sendenhorst (DE); THYSSENKRUPP STEEL EUROPE AG, Duisburg (DE)

(72) Inventors: Heiko Ohlscher, Sendenhorst (DE); Michael Gövert, Leverkusen (DE)

(73) Assignees: WF-MASCHINENBAU U. BLECHFORMTECHNIK GMBH & CO. KG, Sendenhorst (DE); THYSSENKRUPP STEEL EUROPE AG, Duisburg (DE)

( * ) Notice: Subject to any disclaimer, the term of this patent is extended or adjusted under 35 U.S.C. 154(b) by 1 day.

(21) Appl. No.: 15/527,075

(22) PCT Filed: Nov. 13, 2015

(86) PCT No.: PCT/EP2015/076587
§ 371 (c)(1),
(2) Date: May 16, 2017

(87) PCT Pub. No.: WO2016/079024
PCT Pub. Date: May 26, 2016

(65) Prior Publication Data
US 2017/0333973 A1 Nov. 23, 2017

(30) Foreign Application Priority Data
Nov. 17, 2014 (DE) ........................ 10 2014 116 786

(51) Int. Cl.
*B21D 22/16* (2006.01)
*B21D 53/10* (2006.01)

(52) U.S. Cl.
CPC ............. *B21D 22/16* (2013.01); *B21D 53/10* (2013.01)

(58) Field of Classification Search
CPC ........ B21D 15/04; B21D 15/06; B21D 17/02; B21D 17/04; B21D 22/14; B21D 22/16; B21D 22/18; B21D 53/10; B21H 5/027
See application file for complete search history.

(56) References Cited

U.S. PATENT DOCUMENTS 4,485,657 A * 12/1984 Ridley .................. B21D 17/02
72/469
4,694,676 A * 9/1987 O'Brien ................. B21D 53/84
72/256

(Continued)

FOREIGN PATENT DOCUMENTS

DE 4425033 A1 1/1996
DE 19820472 A1 * 10/1998 ............. B21D 15/02

(Continued)

OTHER PUBLICATIONS

EPO Machine Translation of DE 10033244 A1; Apr. 2018.*

(Continued)

*Primary Examiner* — Pradeep C Battula
(74) *Attorney, Agent, or Firm* — Patent Portfolio Builders PLLC

(57) ABSTRACT

A method for manufacturing a rotationally symmetrical shaped article, which has a cylindrical, concentric hub axially closed on one side, in a shaping process is performed such that at least one pressure roll is in contact with a rotating, closed, planar circular blank sheet and presses the material of the blank radially from the outside inward against a projecting part that runs upright on the circular blank such that the thickness of the circular blank decreases and the hub including a blind hole is formed.

10 Claims, 3 Drawing Sheets

(56) References Cited

U.S. PATENT DOCUMENTS

| | | | |
|---|---|---|---|
| 5,970,776 A | 10/1999 | Iijima et al. | |
| 6,647,839 B2 * | 11/2003 | Yoshitome | B21D 22/14 72/71 |
| 2001/0035036 A1 | 11/2001 | Monahan et al. | |

FOREIGN PATENT DOCUMENTS

| | | | |
|---|---|---|---|
| DE | 29906427 U1 | 7/1999 | |
| DE | 19958343 A1 | 6/2001 | |
| DE | 10121546 A1 | 11/2001 | |
| DE | 10033244 A1 * | 1/2002 | B21H 1/04 |
| DE | 60104582 T2 | 8/2005 | |
| DE | 102007022012 A1 | 11/2008 | |
| DE | 102007023972 A1 | 11/2008 | |
| DE | 102013101555 B3 | 5/2014 | |

OTHER PUBLICATIONS

Citation of Relevant Documents issued by GPTO for related DE Application No. 10 2014 116 786.4 filed on Nov. 13, 2015.
Excerpt of Online Patent Register from GPTO for related DE Application No. 10 2014 116 786.4, last updated on Apr. 10, 2017.
International Search Report dated Jan. 28, 2016 in related International Application No. PCT/EP2015/076587.
Written Opinion dated Jan. 28, 2016 in related International Application No. PCT/EP2015/076587.

\* cited by examiner

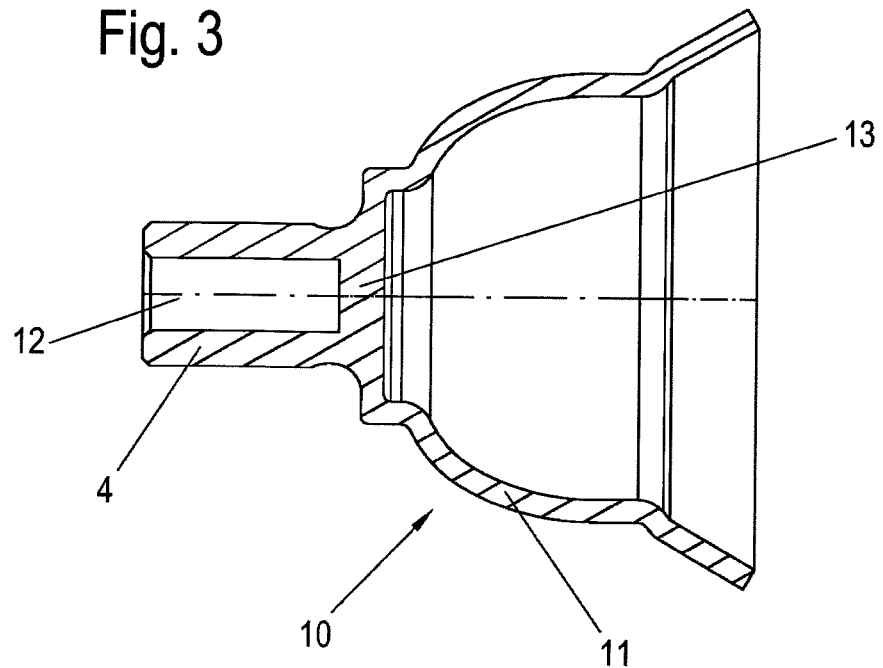
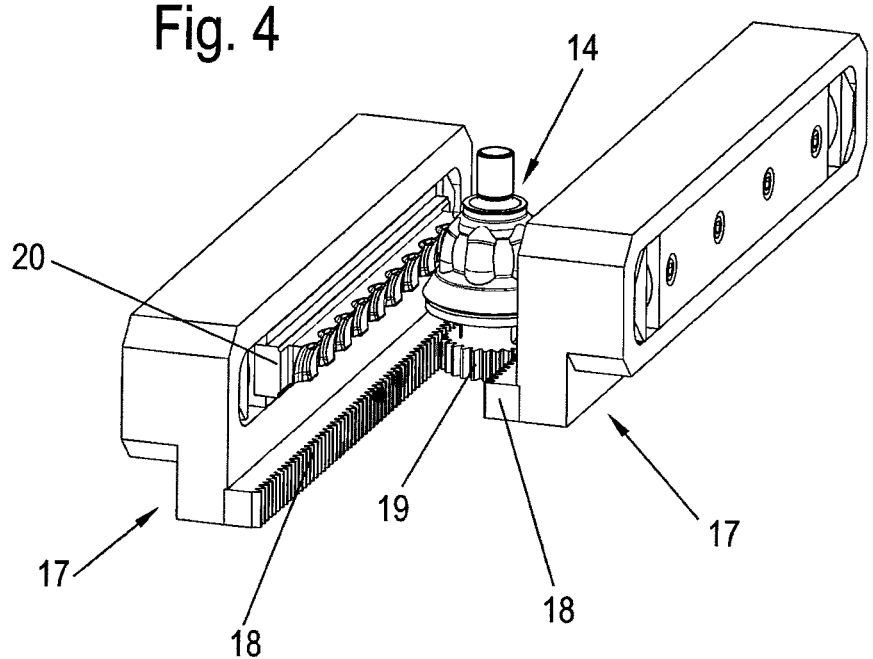

METHOD FOR MANUFACTURING A ROTATIONALLY SYMMETRICAL SHAPED ARTICLE

BACKGROUND AND SUMMARY OF THE INVENTION

Exemplary embodiments of the invention relate to a method for producing a rotationally symmetrical shaped article.

Such shaped articles are used in many different areas. The production of an axle journal or pivot pin shall be mentioned here by way of example, as disclosed for example in German patent document DE 10 2013 101 555 B3.

The production of the shaped article known therefrom and made of metal, especially steel, and which in addition to an integrally formed hub comprises a bell-shaped bottom part provided with contouring, preferably occurs by using a tube as a semi-finished product, wherein the formed hub is sealed at its outer end by deforming, so that the shaped article is present in its final configuration as a component which is open on one side.

Although the use of a circular blank is mentioned in the aforementioned literature as a semi-finished product, further details in this respect are not provided.

However, applications for such an axle journal or pivot pin are provided in which the hub needs to be provided with an inner toothing, for example, into which a corresponding part engages, which can be inserted from the outside. In this respect, the interior space of the shaped article shall only be open on the side opposite the hub but closed in all other respects to form a depot for grease, which is used for the operation of rolling bodies positioned in the interior space during operation of the shaped article.

To provide such an axle journal, which therefore comprises a bell-shaped bottom part that is open on one side and a hub that is open to the outside and adjoins the bottom part, the respective formation of the hub as well as the bottom part occurred until now by forging and subsequent machining of the hub to introduce an inner bore.

This type of production can only be conducted with great effort, leading to unacceptable production costs, which are especially deplorable since such shaped articles are used as serial products in large numbers.

Furthermore, the forging to form such a shaped article requires high material input, which on the one hand similarly has a negative effect on the production costs and on the other hand, especially in the case of pivot pins or axle journals used in motor vehicles, runs counter to the permanently demanded reduction and optimization concerning the weight.

The invention is therefore directed to a method of the generic kind in which production of the rotationally symmetrical shaped article is possible with optimization concerning the production and the material.

Exemplary embodiments of the invention provide a method for manufacturing a rotationally symmetrical shaped article, which is manufactured in a forming process and comprises a cylindrically shaped, concentric hub that is axially closed on one side, in which at least one rotatable spinning roller acts on a rotating, closed and preferably planar circular blank made from sheet metal, with which material, by reducing the thickness of the circular blank, is pressed radially from the outside inwardly against a projecting part that runs upright on the circular blank by forming the hub, especially by forming a blind hole within the hub.

The spinning roller is moved inwardly radially from the outside, so that a hub is formed by a forming process.

As was noticed surprisingly, a rotationally symmetrical shaped article can be produced by generally known spin forming using a spinning roller by using a closed metallic circular blank in accordance with the invention, i.e., a circular blank without a central hole, which rotationally symmetrical shaped article can be further processed into differently configured end products. Because no central hole is present, a blind hole is advantageously and simply formed within the hub, which is advantageous when the region within the hub is formed in a closed manner, e.g., if a grease depot is to be formed.

The starting product for further processing is the rotationally symmetrical shaped article produced according to the method described above and which is present in the simplest configuration by consisting of a radially extending flange that is planar on both sides and an adjoining hub that is formed as a hollow cylinder with a closed base and is open towards the side facing away from the flange.

A machining process for producing said hub is thus no longer necessary, thus not only providing the aforementioned advantages with respect to production, but also such concerning the load-bearing capacity. This is especially advantageous as a result of the missing notch effect by the fiber orientation interrupted during forming within the terms of the invention.

It is provided according to a further aspect of the invention to provide the hub with an inner and/or outer toothing, wherein this also occurs without machining and preferably during the forming of the hub. For this purpose, the projecting part is provided with a respective profiling on the outside, whereas for forming an outer toothing a die is provided that acts on the exterior side on the formed hub and is also provided with a respective profiling. Apart from that, the projecting part is driven with the same rotational speed as the rotating circular blank.

As was surprisingly recognized, the formation of the hub is especially simple if the circular blank is heated to a temperature of approximately 400° C. to 1200° C. during the forming of the hub.

In a subsequent working step, the radial flange of the circular blank or the formed shaped article adjoining the hub can be formed into a bell-shaped bottom part, wherein an exemplary and preferred configuration is shown in the aforementioned German patent document DE 10 2013 101 555 B3. The base of the blind hole preferably lies between the hub and the bell-shaped bottom part.

The forming preferably also occurs after heating, preferably in a temperature range beneath a hardening temperature.

The shaping of the bell-shaped bottom part can occur by pressing by means of a suitable pressing die or by pressing by means of a rotating spinning roller in interaction with a contour mandrel.

In the case of machining of the shaped article into an axle journal or pivot pin, whose bell-shaped bottom part comprises cage or ball tracks, the bell-shaped bottom part that is present as a blank is preferably partially heated in the regions which during the subsequent forming are formed into cage tracks by pressing against the contour mandrel. The heating can preferably also occur to a temperature of between approximately 400° C. and 1200° C.

The stamping of the cage tracks occurs according to a further aspect of the invention by means of stamping beams that are moved linearly against each other and between which the shaped article is positioned as a blank of this method step on the contour mandrel, wherein the contour mandrel on the one hand and the stamping beams on the other hand are each provided with a profiling, which correspond to each other to such an extent that the contour of the cage track is formed.

In this process, the cage tracks can be hardened by press hardening simultaneously with the formation thereof, wherein it is a further advantage of this method step to already bring the cage tracks with respect to their dimensioning to a target dimension or with an oversize if hard machining is to occur subsequently.

The ball tracks which are necessary for the proper use of the pivot pin are also formed by means of the stamping beams and optionally post-hardened.

BRIEF DESCRIPTION OF THE DRAWING FIGURES

The method in accordance with the invention will be explained below in closer detail by reference to the enclosed drawings, wherein:

FIG. 3 shows a longitudinal sectional view of the shaped article according to FIG. 2;

FIGS. 4 and 5 show an apparatus for further machining the blank according to FIG. 2 in different views;

DETAILED DESCRIPTION

Figure 1:
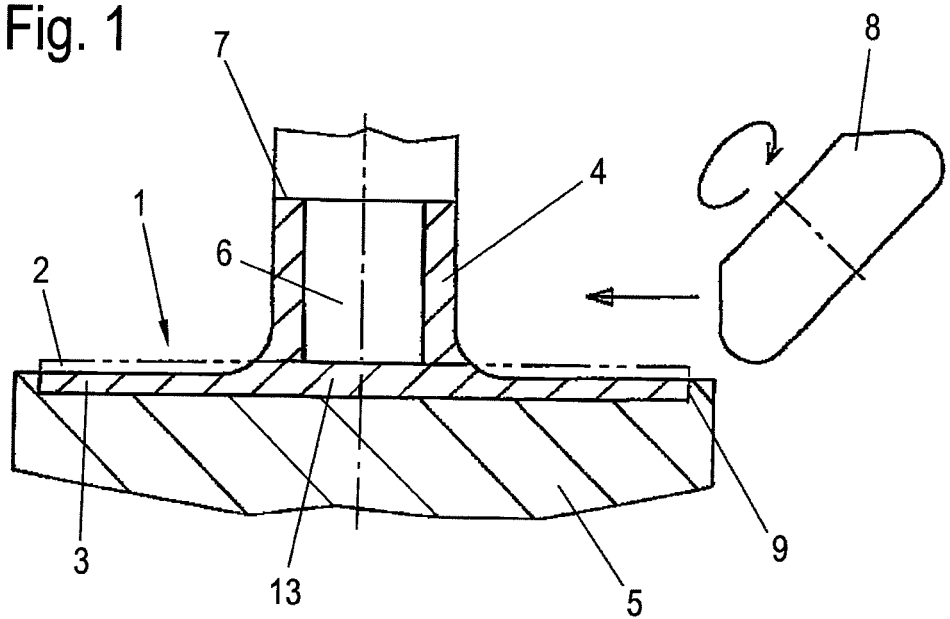
FIG. 1 shows a sectional schematic side view of an apparatus for carrying out the method.

FIG. 1 illustrates the method in accordance with the invention, with which a rotationally symmetrical shaped article 1 is produced by a forming process, which article comprises a concentric hub 4, wherein the axially extending hub 4 is closed on one side.

For this purpose, a closed circular blank 2 is provided, which is planar in this case in a preferred embodiment and is indicated in the drawing by the dot-dash line. The blank is then inserted into a die 5, which circumferentially comprises an abutment chuck 9, on which the circular blank 2 can be supported at its outer edge during the subsequent process and then rests thereon.

On the side facing away from the die 5, a projecting part 6 runs upright on the circular blank 2, which comprises with distance a stop shoulder 7.

The circular blank 2 is then made to rotate. To form the hub a rotatable spinning roller 8 acts in a method step on the rotating circular blank 2 from the outer edge under radial advancement, with which the material, by reducing the thickness of the circular blank 2 in the region preferably covered by the spinning roller 8, is preferably pressed under radial movement of the spinning roller 8 from the outside to the inside. The spinning roller 8 preferably axially enters the circular blank 2 at first close to the outer edge of the circular blank 2 and is moved radially to the inside at this time or during the process. During the first plunging, the circular blank 2 preferably slightly widens and moves against the abutment chuck 9.

The material is then pressed against the projecting part 6 by formation of the hub 4. In this process, the circular blank 2 is preferably reduced in some sections in its thickness, thus producing in this region a radially extending flange 3, which is illustrated with the solid line. The material used is a metal.

The material pressed against the projecting part 6 is guided up to the stop shoulder 7 or it flows up to this point, so that the stop shoulder 7 thus forms a length limitation for the hub 4.

A blind hole 12 with a closed base 13 (FIG. 3) is formed during the forming of the hub 4 by the continuously closed circular blank 2. The blind hole 12 is formed within the hub 4. The base 13, which seals the hub 4 axially on one side so that the blind hole 12 is formed, extends radially from the hub radially to the inside. The hub 4 is open at the end facing away from the flange 3 and the base 13 of the blind hole 12.

In a subsequent method step, a blank 10 with a bell-shaped bottom part 11 is formed from the flange 3. The blank 10 further comprises the hub 4. A contour mandrel (not shown), which is described in German patent document DE 10 2013 101 555 B3, can preferably be used for this purpose. The flange is integrally attached thereto or placed thereon, e.g., by one or several spinning rollers in a spin forming method by pressing or by a press in a pressing method.

Figure 2:
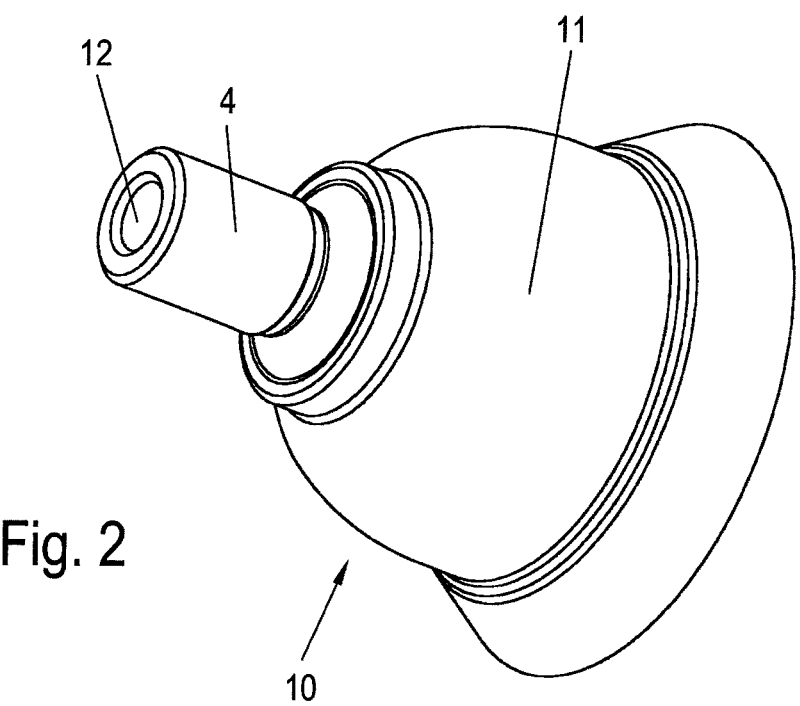
FIG. 2 shows a perspective view of the shaped article which is formed into a blank in a further method step.
Figure 5:
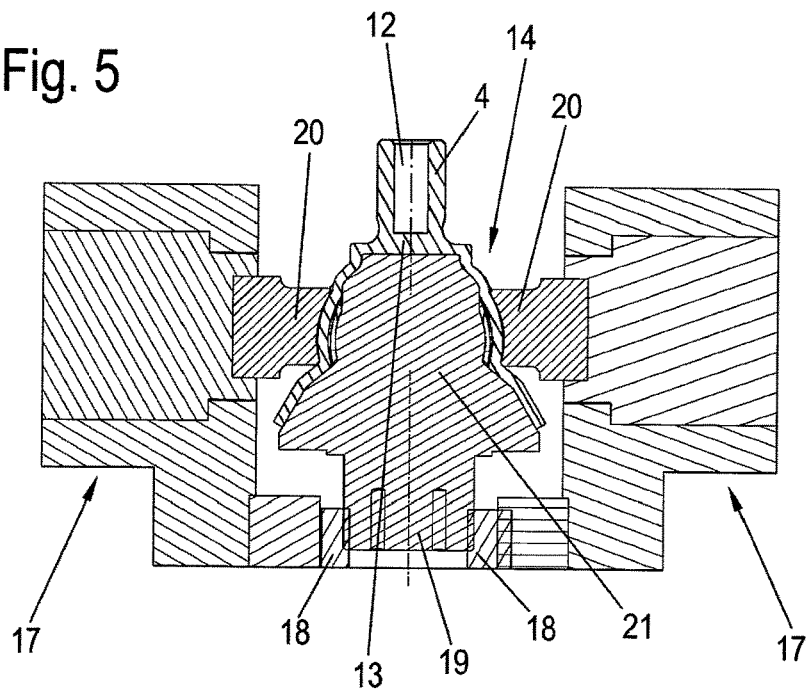

The blank 10 formed in this manner is shown in FIGS. 2 and 3. FIG. 3 shows especially clearly that the base 13 seals the blind hole 12 towards the bell-shaped bottom part 11. This is especially advantageous. FIGS. 2 and 3 thus show an exemplary and preferred bell shape. The bell-shaped bottom part 11 extends on one side of the base 13. The hub 4 extends axially on the other side of the base 13. The hub 4 and the bell-shaped bottom part 11 are thus separated from each other by a base 13.

Figure 6:
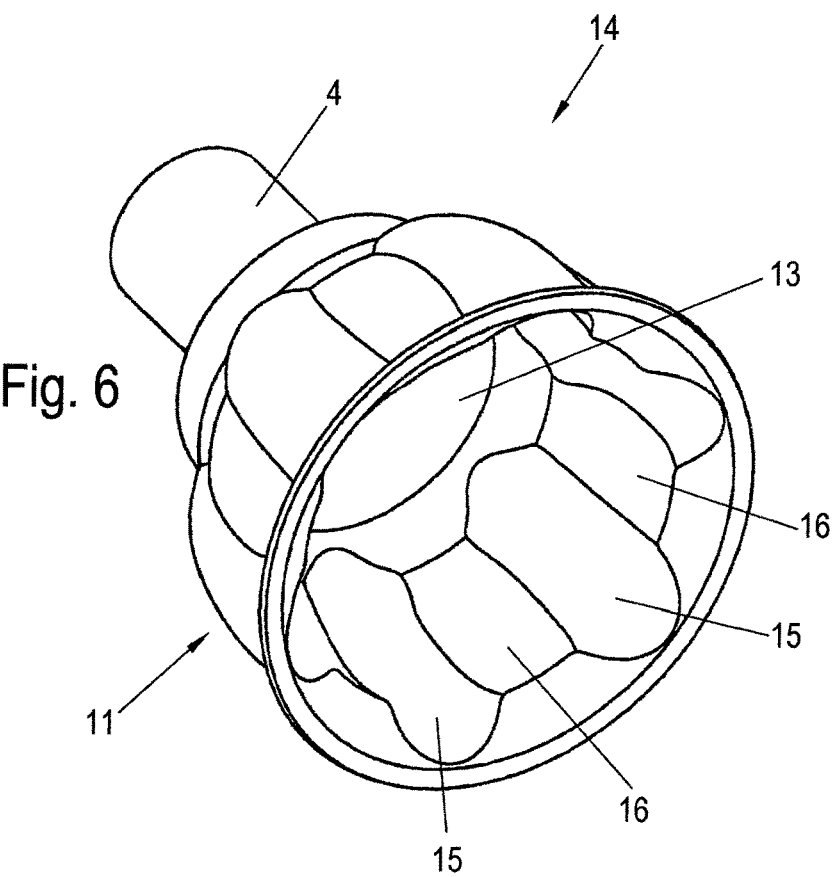
FIG. 6 shows a perspective view of a shaped article which is completed with respect to its shaping.

FIG. 6 shows a pivot pin as a finished end product, having an inner contouring, consisting of, in this example, six ball tracks 15 and adjoining cage tracks 16, wherein the ball tracks 15 are used for accommodating the rolling balls, whereas the cage tracks 16 form an interlocking retainer for the rolling balls.

To form the ball tracks 15 and the cage tracks 16 on the inside of the bell-shaped bottom part 11, stamping beams 17 are provided, which are linearly movable in parallel in opposite directions and comprise shaping strips 20 arranged on their mutually facing sides. The ball tracks 15 and the cage tracks 16 are integrally formed by the shaping strips 20 in a further method step on the blank 10 with the hub 4 and the bell-shaped bottom part 11, which blank is placed on a mold core 21. The shaping strips 20, with respect to the inner contouring of the bell-shaped bottom part 11, respectively form a female die and the mold core 21 a male die. The mold core 21 is rotated together with the blank 10. The shaping strips are moved tangentially on the blank 10, so that the ball tracks 15 and the cage tracks 16 are formed.

In this process, the blank 10 lies with its bell-shaped bottom part 11 between the shaping strips 20, which are pressed during the movement against the bell-shaped bottom part 11, so that the inner contour is formed with the ball and cage tracks 15, 16.

For synchronous adjustment of the two stamping beams 17, they each comprise a toothed rack 18 on their mutually facing sides, which mesh with a gearwheel 19 of the mold core 21, wherein the blank 10 is retained in a rotationally fixed manner on the mold core 21.

An inner toothing can already be introduced into the hub 4 during the production of the shaped article 1, wherein the teeth extend in the axial direction of the hub 4. In this case, a respective shaping of the projecting part 6 is necessary, which apart from that rotates jointly with the circular blank 2.

A toothing can also be introduced into the outer jacket surface of the hub 4, wherein both the inner and outer toothing, in the event of respective configuration of the stamping beams 17, can also be introduced during the forming of the inner contour of the bell-shaped bottom part 11.

Notice must be taken that the individual method steps can be carried out on an apparatus comprising a single machine that is converted for the different following method steps or on an apparatus with several adjacently arranged machines on which the individual method steps are carried out.

Although the present invention has been described above by means of embodiments with reference to the enclosed drawings, it is understood that various changes and developments can be implemented without leaving the scope of the present invention, as it is defined in the enclosed claims.

LIST OF REFERENCE NUMERALS

1 Shaped article
2 Circular blank
3 Flange
4 Hub
5 Die
6 Projecting part
7 Stop shoulder
8 Spinning roller
9 Abutment chuck
10 Blank
11 Bottom part
12 Blind hole
13 Base
14 Pivot pin
15 Ball track
16 Cage track
17 Stamping beam
18 Toothed rack
19 Gearwheel
20 Shaping strip
21 Mold core

The invention claimed is:

1. A method for manufacturing a rotationally symmetrical shaped article having a concentric hub, which is produced by a forming process, closed axially on one side and formed in a cylindrical manner, the method comprising:

causing at least one spinning roller to act on a rotating, closed and planar circular blank made of sheet metal, with which material of the circular blank, by reducing the thickness of the circular blank, is pressed against a projecting part standing upright against the circular blank radially from an outside to an inside by forming the hub with a blind hole, wherein, from a flange radially adjoining the hub, a blank in form of a bell-shaped bottom part is formed by spinning or pressing, wherein the bell-shaped bottom part is provided by a non-cutting forming process with an inner contour, consisting of ball tracks for accommodating rolling bodies and cage tracks adjacent to the ball tracks, and wherein the ball tracks and the cage tracks are formed by shaping strips, which are movable linearly in parallel and against each other, in correspondence with a mold core that holds the circular blank in a twist-proof manner, under formation of a pivot pin.

2. The method of claim 1, wherein the blind hole comprises a base lying between the hub and the bell-shaped part.

3. The method of claim 1, wherein the circular blank is heated before or during the forming of the hub to a temperature of approximately 400° C. to 1200° C.

4. The method of claim 1, wherein the hub is provided with an inner and/or outer toothing, wherein the teeth respectively extend in an axial direction of the hub.

5. The method of claim 4, wherein the inner and/or outer toothing is shaped during forming of the hub.

6. The method of claim 1, wherein an edge region of the flange adjoining the hub is heated before or during the forming of the bell-shaped bottom part under hardening temperature.

7. The method of claim 6, wherein the bell-shaped bottom part is heated to the hardening temperature before or during the forming of the cage track in its region to be formed.

8. The method of claim 1, wherein the shaping strips are pressed against the circular blank.

9. The method of claim 1, wherein the ball tracks are hardened after their formation.

10. The method of claim 1, wherein the blind hole is formed axially within the hub.

* * * * *